US012109673B1

(12) United States Patent
Jing

(10) Patent No.: US 12,109,673 B1
(45) Date of Patent: Oct. 8, 2024

(54) VIBRATION SUPPRESSION BAR HANDLE STRUCTURES FOR HIGH-VIBRATION HANDHELD MACHINES

(71) Applicant: City University of Hong Kong, Kowloon (HK)

(72) Inventor: Xingjian Jing, Sha Tin (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 18/188,066

(22) Filed: Mar. 22, 2023

(51) Int. Cl.
*B25D 17/04* (2006.01)

(52) U.S. Cl.
CPC .... *B25D 17/043* (2013.01); *B25D 2217/0073* (2013.01); *B25D 2250/371* (2013.01)

(58) Field of Classification Search
CPC .................................................... B25D 17/043
See application file for complete search history.

(56) References Cited

U.S. PATENT DOCUMENTS 4,673,043 A * 6/1987 Greppmair ............. B25D 17/11 173/211
5,095,600 A * 3/1992 Allan .................... E01C 23/124 29/81.11
7,059,423 B1 * 6/2006 Hoggarth ............... B25D 17/24 173/90
2019/0283228 A1 * 9/2019 Jing ..................... B25D 17/043

OTHER PUBLICATIONS

Y.K. Dange et al., Analysis of a nonlinear vibration isolator with the help of an analog computer, Indian J. Technol. 16 (1978) 282-285.
M.S. Hundal et al., Response of a base excitation system with Coulomb and viscous friction, J. Sound Vibr. 64 (3) (1979) 371-378.
T.A. Nayfeh et al., Application of nonlinear localization to the optimization of a vibration isolation system, Am. Inst. Aeronautics Astronautics J. 35 (8) (1997) 1378-1386.
Ibrahim, R.A., Recent advances in nonlinear passive vibration isolators, J. Sound Vib. 314 (2008) 371-452.
I. Kovacic et al., A study of a nonlinear vibration isolator with a quasi-zero-stiffness characteristic, J. Sound Vibr. 315 (3) (2008) 700-711.

(Continued)

*Primary Examiner* — Nathaniel C Chukwurah
(74) *Attorney, Agent, or Firm* — Norton Rose Fulbright US LLP

(57) ABSTRACT

Vibration suppression handle structures for high-vibration handheld machines (e.g., jackhammers, hydraulic breakers, hammer drills, soil compactors, etc.) are provided that offer improved vibration suppression. The provided handle structures include a handle that is connected to vibration suppression systems that include an arrangement of support members and resilient members for improved vibration suppression over typical high-vibration handled machines while remaining a compact design. A portion of the support members are arranged as X-shaped support structures. In at least some embodiments, the handle structures include a system by which to adjust a stiffness, and therefore vibration suppression, of the vibration suppression systems. Jackhammers are further provided that include the provided vibration suppression handle structures.

19 Claims, 20 Drawing Sheets

(56) References Cited

OTHER PUBLICATIONS

X.J. Jing et al., Frequency domain analysis of a dimensionless cubic nonlinear damping system subject to harmonic input, Nonlinear Dyn. 58 (3) (2009) 469-485.
T.D. Le et al., A vibration isolation system in low frequency excitation region using negative stiffness structure for vehicle seat, J. Sound Vibr. 330 (26) (2011) 6311-6335.
T.A. Su et al, Hand-arm vibration syndrome among a group of construction workers in Malaysia, J. Occup Environ. Med. 68 (1) (2011) 58-63.
C.M. Lee et al., A multi-stage high-speed railroad vibration isolation system with "negative" stiffness, J. Sound Vibr. 331 (4) (2012) 914-921.
Wang, Y. et al, : Human head-neck models in whole-body vibration: effect of posture. J. Biomech. 46, 702-710 (2013).
Tarabini, M. et al., Analysis of non-linear response of the human body to vertical whole-body vibration. Ergonomics 57(11), 1711-1723 (2014).
X.J. Jing et al., Nonlinear characteristic output spectrum for nonlinear analysis and design, IEEE/ASMETrans. Mechatron. 19 (1) (2014) 171-183.
X. Sun et al., Vibration isolation via a scissor-like structured platform, J. Sound Vibr. 333 (9) (2014) 2404-2420.
C.C. Liu et al., Recent advances in micro-vibration isolation, Mech. Syst. Signal Process. 56-57 (2015) 55-80.
X.J. Jing et al., Frequency Domain Analysis and Design of Nonlinear Systems Based on Volterra Series Expansion: A Parametric Characteristic Approach, Springer International Publishing, Switzerland, 2015.
Z. Wu et al., Robert Allen, Vibration isolation by exploring bio-inspired structural nonlinearity, Bioinspiration Biomimetics 10 (5) (2015), 056015-056015.
F. Hu et al., A 6-DOF passive vibration isolator based on Stewart structure with X-shaped legs, Nonlinear Dyn. 91 (2018) 157-185.
J. Bian et al., Superior nonlinear passive damping characteristics of the bio-inspired limb-like or X-shaped structure, Mech. Syst. Signal Process. 125 (2019) 21-51.
Y. Chai et al., Analysis X-shaped mechanism based enhanced tunable QZS property for passive vibration isolation, Int. J. Mech. Sci. 168 (2022) 108-651.
J.E. Ruzicka et al., Influence of damping in vibration isolation, the shock and vibration information center, Shock and Vibration Information Center, Washington, DC, 1971, http://www.dtic.mil/docs/citations/AD0737829.
Mechanical vibration—Measurement and evaluation of human exposure to hand-transmitted vibration. ISO 5349-2001. https://www.iso.org/standard/32355.html.

* cited by examiner

| Δy (mm) | F (N) |
|---|---|
| 0 | 19.6 |
| 1 | 39.2 |
| 3 | 58.8 |
| 6 | 78.4 |
| 10 | 98 |
| 15 | 117.6 |
| 21 | 137.2 |
| 26 | 156.8 |
| 32 | 176.4 |
| 39 | 196 |
| 48 | 215.6 |
| 58 | 235.2 |
| 66 | 245 |

FIG. 17

| F (N) | Δy (mm) in 1st measurement | Δy (mm) in 2nd measurement |
|---|---|---|
| 190.1 | 0 | 0 |
| 196 | 1 | 1 |
| 215.6 | 4.8 | 5 |
| 235.2 | 11 | 10 |
| 245 | 14.6 | 13 |
| 254.8 | 19 | 17 |
| 280.3 | 32 | 31 |
| 294 | 45.5 | 45 |
| 297.9 | 56 | 57 |
| 294 | 66 | 66 |

FIG. 18

VIBRATION SUPPRESSION BAR HANDLE STRUCTURES FOR HIGH-VIBRATION HANDHELD MACHINES

TECHNICAL FIELD

The present application relates generally to high-vibration handheld machines such as jackhammers. More specifically, the present application relates to vibration suppression handle structures that include X-shaped support structures and an arrangement of resilient members to provide improved vibration suppression for high-vibration handheld machines.

BACKGROUND OF THE INVENTION

Prolonged and/or frequent vibration is typically undesirable for machines and structures as vibration can cause their destruction. In humans, prolonged and/or frequent vibration can induce discomfort, fatigue, hearing problems, or vibration-related syndrome, which includes damage to sensory nerves, muscles and joints in the hands and arms. Workers (e.g., construction, engineering, agriculture, or mining workers) that use high-vibration equipment (e.g., jackhammers, hydraulic breakers, etc.) are therefore at risk of these vibration-related symptoms.

High-vibration equipment used by humans typically includes at least one vibration suppressor to reduce the vibrations transferred to the body of a human operator. Typical vibration suppressors (e.g., traditional springs or dampers) applied in a traditional way, however, do not suitably protect against the damage caused by vibration. For instance, with typical high-vibration equipment in the form of a jackhammer, a worker needs to press down to hold the equipment tightly in order for high demolition efficiency, which assists in transferring vibration to the worker. Additionally, the compression in traditional springs or damper materials leads to dramatically increasing stiffness and consequently limits vibration suppression.

BRIEF SUMMARY OF THE INVENTION

New and innovative vibration suppression handle structures for high-vibration handheld machines (e.g., jackhammers, hydraulic breakers, hammer drills, soil compactors, etc.) are provided that offer improved vibration suppression. An embodiment of the handle structures may be connected to a body of the handheld machine. The handle structures provided according to embodiments include a handle that is connected to vibration suppression systems that include an arrangement of multiple support members and resilient members for vibration suppression. Some of the support members are arranged in X-shaped structures. In an example, one leg of the handle is connected to a first vibration suppression system, and the other leg of handle is connected to a second vibration suppression system. The vibration suppression systems are adjustable in size and stiffness and thus can be adapted for different sized or shaped handheld machines.

The vibration suppression systems of the handle structures can achieve a flexible nonlinear stiffness, which contains zero or quasi-zero stiffness (QZS), negative stiffness and positive stiffness. A smooth multi-equilibria state is also achievable. In at least some examples, when the handles of the jackhammer are pressed down, the loading capacity increases rapidly, but with a decreasing stiffness compared to the increasing stiffness of typical elastic materials (e.g., coil springs), and soon reaches the working quasi-zero stiffness region, which results in low resonant frequency (e.g., near zero or equal to zero) of the vibration suppression system (e.g., from the jackhammer body to the handles) and consequently improved vibration suppression performance when working in the quasi-zero stiffness region. Other properties of the working quasi-zero stiffness region include that the resulting resonant frequency decreases as the downward force on the jackhammer increases, and that the structural parameters of the handle structures can be designed to enable a large quasi-zero stiffness region so as to bear with large vibration displacement (e.g., up to 10 cm) required by high-vibration handheld machines. Accordingly, operators of a high-vibration handheld machine equipped with an embodiment of the provided handle structure are subjected to less vibration than when using a high-vibration handheld machine with a typical handle structure.

In at least some embodiments, a stiffness of the vibration suppression systems may be adjusted via an adjustment system of the handle structure. In an embodiment of the adjustment system, a first portion of the adjustment system is included with (e.g., connected to) a mount of the handle structure and a second portion of the adjustment system is included with (e.g., connected to) the handle. The mount can be considered a part of the handle structure or a separate component to which the handle structure is attached. The first portion of the adjustment system included with the mount includes, in an embodiment, a shaft that includes a threaded portion, and an adjusting member, a first stop member, and a resilient member that are each disposed around the shaft. The resilient member is disposed between the adjusting member and the first stop member. A nut or other suitable fixation member disposed on the shaft maintains a distance between the adjusting member and the first stop member. Moving the adjusting member along the shaft (e.g., rotating the adjusting member) changes a distance between the adjusting member and the first stop member and thereby a stiffness of the resilient member.

The second portion of the adjustment system included with the handle includes a second stop member. When the handle is pressed towards the body of the handheld machine, the second stop member at some point makes contact with the first stop member. As such, the stiffness of the resilient member affects a stiffness of the vibration suppression systems since the handle is connected to each of the vibration suppression systems. The stiffness of the vibration suppression systems can be adjusted as desired by an operator of the handheld machine, such as to adjust the range of handle depression (e.g., a distance the handle is away from the body of the handheld machine) within which the vibration suppression systems exhibit quasi-zero stiffness.

In a first aspect, a handle structure for vibration suppression includes a handle and a vibration suppression system connected to the handle. The vibration suppression system comprises a first X-shaped support structure and a second X-shaped support structure. The first X-shaped support structure includes a first support member rotatably connected to a second support member at a first joint. The second X-shaped support structure is rotatably connected to the first X-shaped support structure at a second joint and a third joint, and the second X-shaped support structure includes a third support member rotatably connected to a fourth support member at a fourth joint. The vibration suppression system further comprises a first resilient member rotatably connected to the first support member and to the second support member; and a second resilient member rotatably connected to the first, second, third, and fourth support members.

In a second aspect, which may be combined with other aspects described herein (e.g., the $1^{st}$ aspect), the first resilient member is connected to a first connect member that is rotatably connected to the first support member at a fifth joint, and the second resilient member is connected to a second connect member that is rotatably connected to the second support member at a sixth joint.

In a third aspect, which may be combined with other aspects described herein (e.g., the $1^{st}$ aspect and the $2^{nd}$ aspect), the handle structure further includes a fifth support member and a sixth support member, the first X-shaped support structure is rotatably connected to the fifth and sixth support members, and the fifth support member is rotatably connected to the sixth support member.

In a fourth aspect, which may be combined with other aspects described herein (e.g., the $1^{st}$ aspect through the $3^{rd}$ aspect), the handle structure further includes a seventh support member and an eighth support member, the second X-shaped support structure is rotatably connected to the seventh and eighth support members, and the seventh support member is rotatably connected to the eighth support member.

In a fifth aspect, which may be combined with other aspects described herein (e.g., the $1^{st}$ aspect through the $4^{th}$ aspect), the handle structure further includes a first pivot member comprising a first body, a first opening extending through the first body, and a first rod extending from the first body. The first support member and the second support member are configured to rotate about the first rod at the first joint, and a shaft is disposed through the first opening of the first pivot member.

In a sixth aspect, which may be combined with other aspects described herein (e.g., the $5^{th}$ aspect), the handle structure further includes a second pivot member comprising a second body, a second opening extending through the second body, and a second rod extending from the second body. The third support member and the fourth support member are configured to rotate about the second rod at the fourth joint, and a shaft is disposed through the second opening of the second pivot member In a seventh aspect, which may be combined with other aspects described herein (e.g., the $6^{th}$ aspect), the handle structure further includes a mount, and an end of the shaft is connected to the mount.

In an eighth aspect, which may be combined with other aspects described herein (e.g., the $1^{st}$ aspect through the $7^{th}$ aspect), each of the first and second resilient members is a spring.

In a ninth aspect, which may be combined with other aspects described herein (e.g., the $5^{th}$ aspect through the $7^{th}$ aspect), a handle structure for vibration suppression includes a handle comprising a first leg and a second leg, and a first vibration suppression system connected to the first leg. The first vibration suppression system includes: a first support member, a second support member rotatably connected to the first support member at a first joint, and a first resilient member rotatably connected to the first support member at a second joint and to the second support member at a third joint. The handle structure further includes a second vibration suppression system connected to the second leg. The second vibration suppression system includes: a third support member, a fourth support member rotatably connected to the third support member at a fourth joint, and a second resilient member rotatably connected to the third support member at a fifth joint and to the fourth support member at a sixth joint.

In a tenth aspect, which may be combined with other aspects described herein (e.g., the $9^{th}$ aspect), the handle structure further includes an adjustment system configured to set a stiffness of the first and second vibration suppression systems.

In an eleventh aspect, which may be combined with other aspects described herein (e.g., the $10^{th}$ aspect), the adjustment system includes a shaft including a threaded portion; an adjusting member disposed around the shaft; a first stop member disposed around the shaft; a resilient member disposed around the shaft and between the adjusting member and the first stop member; and a second stop member. Movement of the adjusting member along the shaft alters a stiffness of the resilient member.

In a twelfth aspect, which may be combined with other aspects described herein (e.g., the $11^{th}$ aspect), the handle structure further includes a first mount. The shaft is connected to the first mount, and the handle includes the second stop member.

In a thirteenth aspect, which may be combined with other aspects described herein (e.g., the $9^{th}$ aspect through the $12^{th}$ aspect), the first vibration suppression system further includes: a fifth support member rotatably connected to the first support member at a seventh joint, a sixth support member rotatably connected to the fifth support member at an eight joint and to the second support member at a ninth joint, and a third resilient member rotatably connected to the first support member and the fifth support member at the seventh joint and to the second support member and the sixth support member at the ninth joint. Additionally, the second vibration suppression system further includes: a seventh support member rotatably connected to the third support member at a tenth joint, an eighth support member rotatably connected to the seventh support member at an eleventh joint and to the fourth support member at a twelfth joint, and a fourth resilient member rotatably connected to the third support member and the seventh support member at the tenth joint and to the fourth support member and the eighth support member at the twelfth joint.

In a fourteenth aspect, which may be combined with other aspects described herein (e.g., the $9^{th}$ aspect through the $13^{th}$ aspect), each of the first and second resilient members is a spring.

In a fifteenth aspect, which may be combined with other aspects described herein (e.g., the $5^{th}$ aspect through the $8^{th}$ aspect, the $10^{th}$ aspect through the $12^{th}$ aspect, and the $14^{th}$ aspect), a jackhammer includes a body and a handle structure connected to the body. The handle structure includes: a handle comprising a first leg and a second leg; a first vibration suppression system connected to the first leg; and a second vibration suppression system connected to the second leg. The handle is configured to translate relative to the body along a first axis. The first vibration suppression system includes a first plurality of support members and a first plurality of resilient members, and the first plurality of support members and the first plurality of resilient members are arranged such that the first vibration suppression system is configured to exhibit quasi-zero stiffness during operation of the jackhammer. The second vibration suppression system includes a second plurality of support members and a second plurality of resilient members, and the second plurality of support members and the second plurality of resilient members are arranged such that the second vibration suppression system is configured to exhibit quasi-zero stiffness during operation of the jackhammer.

In a sixteenth aspect, which may be combined with other aspects described herein (e.g., the $15^{th}$ aspect), the first and second vibration suppression systems are each configured to exhibit quasi-zero stiffness based on a force applied to the handle and a location of the handle relative to the body along the first axis.

In a seventeenth aspect, which may be combined with other aspects described herein (e.g., the $1^{st}$ aspect through the $9^{th}$ aspect and the $14^{th}$ aspect through the $16^{th}$ aspect), the handle structure further includes an adjustment system configured to adjust a stiffness of the handle structure with respect to a direction along the first axis.

In an eighteenth aspect, which may be combined with other aspects described herein (e.g., the $17^{th}$ aspect), the adjustment system comprises a first stop member and a second stop member. The handle includes the second stop member, and the second stop member contacts the first stop member when the handle is translated towards the body along the first axis.

In a nineteenth aspect, which may be combined with other aspects described herein (e.g., the $15^{th}$ aspect through the $18^{th}$ aspect), the body comprises a first side opposite a second side, wherein the first vibration suppression system is disposed on the first side of the body, and wherein the second vibration suppression system is disposed on the second side of the body.

In a twentieth aspect, which may be combined with other aspects described herein (e.g., the $15^{th}$ aspect through the $19^{th}$ aspect), each of the first and second plurality of resilient members is a spring.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 17 is a table of measured values showing the vertical static force of the handle of the handle structure including two resilient members in relation to displacement of the handle.

FIG. 18 is a table of measured values showing the vertical static force of the handle of the handle structure including four resilient members in relation to displacement of the handle.

DETAILED DESCRIPTION OF THE INVENTION

Figure 1A:
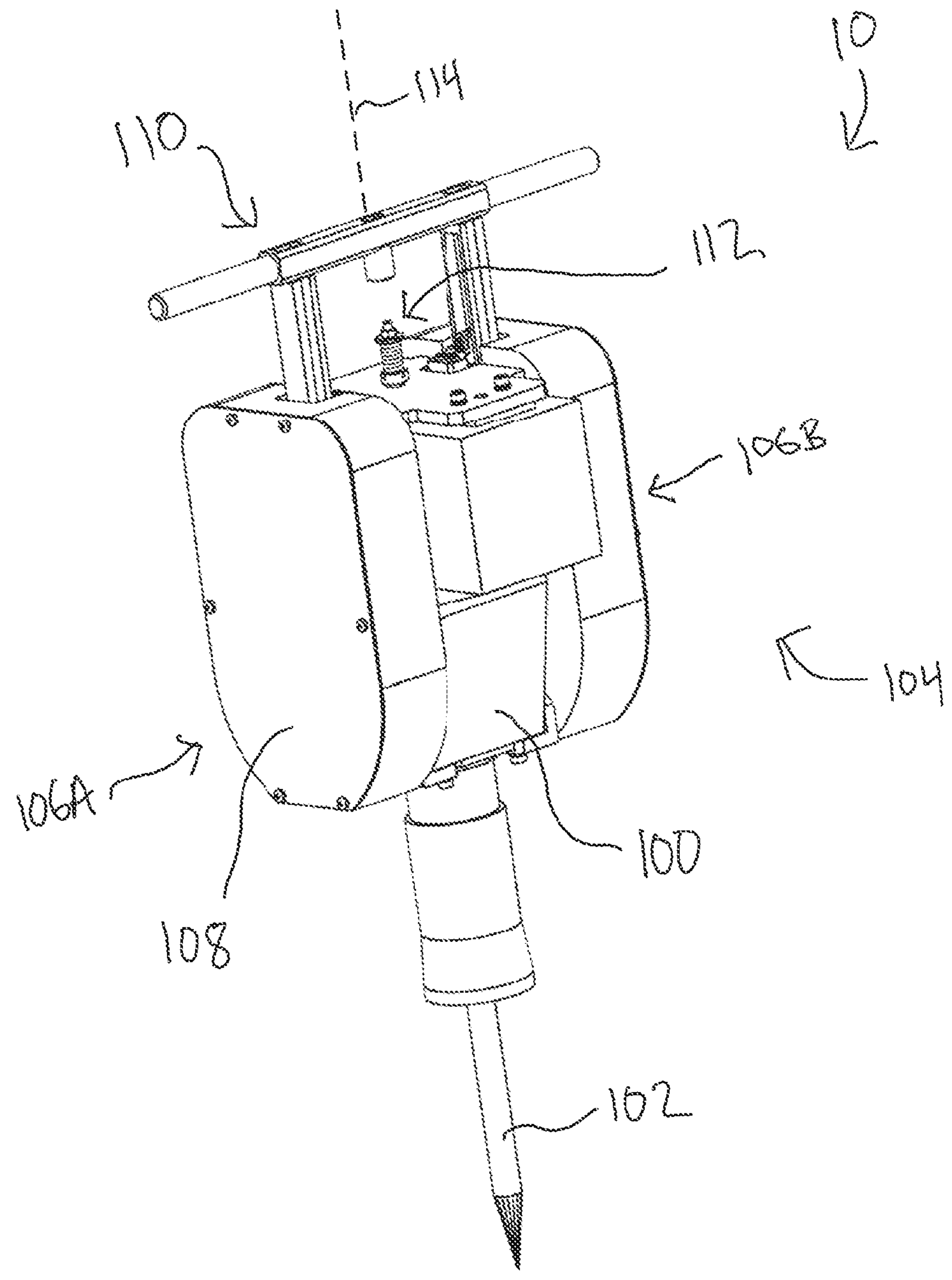
FIG. 1A illustrates a perspective view of a jackhammer, according to an aspect of the present disclosure.

The present disclosure provides new and innovative handle structures for high-vibration handheld machines. For example, new and innovative jackhammers are provided with an embodiment of the handle structures. In at least some embodiments, an existing handle structure on a typical jackhammer may be removed and replaced by an embodiment of the provided handle structure. The provided handle structures include a handle that is connected to vibration suppression systems that include an arrangement of support members and resilient members for improved vibration suppression over typical high-vibration handled machines while remaining a compact design. A portion of the support members are arranged as X-shaped support structures. In at least some embodiments, the handle structures include a system by which to adjust a stiffness, and therefore vibration suppression, of the vibration suppression systems. The stiffness adjustment system can compensate the stiffness of the vibration suppression system in the negative stiffness region, and can also meet the needs of different operators while extending the quasi-zero stiffness region.

In operation according to embodiments, the provided handle structures are ergonomic in that provide a relatively stable handle level and reactive force for an operator of the provided jackhammers while obtaining the high-efficiency vibration suppression effect, which enables the jackhammers to meet the complex and high-intensity work required of the jackhammers. The vibration suppression systems of the handle structures can also achieve a flexible nonlinear stiffness, which contains zero or quasi-zero stiffness (QZS), negative stiffness and positive stiffness. A smooth multi-equilibria state is also achievable. In at least some examples, when the handle is pressed down, the loading capacity increases rapidly, and soon results in a region in which the vibration suppression systems exhibit quasi-zero stiffness, which results in improved vibration suppression performance when working in the quasi-zero stiffness region. Accordingly, operators of a high-vibration handheld machine equipped with an embodiment of the provided handle structure are subjected to less vibration than when using a high-vibration handheld machine with a typical handle structure.

While reference is made to jackhammers throughout this description, one having skill in the art will appreciate how to implement the provided vibration suppression handle structures into other suitable high-vibration handheld machines (e.g., hydraulic breakers, hammer drills, soil compactors, etc.) operated manually by humans. For instance, in any of the embodiments of the handle structure, the various parameters of the handle structure (e.g., support member lengths, spring stiffness, initial assembly angles, spring connection parameters, etc.) can be selected (e.g., tuned) to flexibly meet various requirements of the different applications of the handle structure. For instance, different applications of the handle structure can have their own specific requirements, such as a working displacement range, a height of the handle structure, and/or a payload and frequency range of external excitation. In an example, initial assembly angles can be selected, and then by combining the selected initial assembly angles with a desired height of the handle structure, the support member lengths can be determined. In another example, the stiffness parameters of the springs in the handle structure can be determined by adjusting the spring stiffness until the handle structure satisfies the requirements of the desired payload and working displacement range. In another example still, the support member lengths and spring connection parameters can be adjusted to obtain a desired loading capacity and quasi-zero stiffness (QZS) zone requirements.

Reference is made herein to joints that facilitate rotation of two connected components with respect to one another. Any suitable joint that connects two components and enables such movement may be used. For example, a bar or bolt positioned through respective openings in each of the two components is one such suitable joint. In various embodiments, a joint may include a pressure ball bearing, a washer, a nut, or any other suitable component for a machine capable of producing high vibrations.

The term "connected" and its other forms are used herein to encompass both direct and indirect connections unless indirect or direct connection is specified. For example, a component A that is connected to a component B, which is connected to a component C, is connected to both component B and component C as the term "connected" is used herein.

As used herein, a resilient member is an elastic component that repeatedly stores and releases mechanical energy. For example, a resilient member may be any suitable spring (e.g., coil spring, extension/tension spring, machined spring, etc.) constructed of any suitable material (e.g., metal, polymer, etc.). In other examples, a resilient member may other suitable resilient mechanisms, such as bendable metal or plastic beams, rubber, metal rubber, a pneumatic bag, magnetic materials, etc. While certain resilient members may be referred to as "horizontal" or "vertical", it will be appreciated that these descriptors are merely used for clarity and do not require a resilient member to be exactly horizontal or exactly vertical.

Figure 1B:
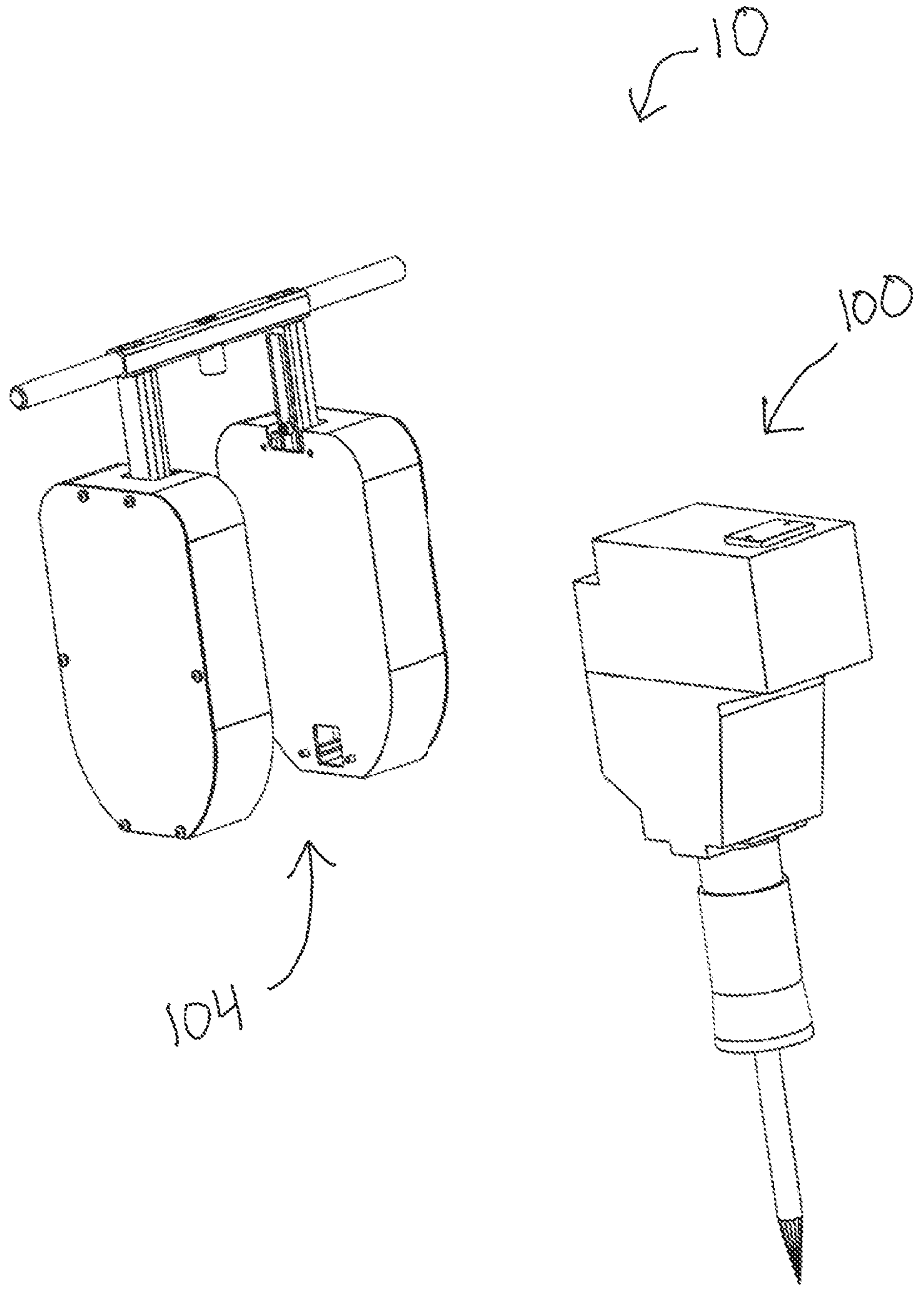
FIG. 1B illustrates a perspective view of the jackhammer of FIG. 1A with the handle structure separate from the jackhammer body, according to an aspect of the present disclosure.

FIGS. 1A and 1B illustrate an example jackhammer 10 that includes a jackhammer body 100 and a handle structure 104. FIG. 1A illustrates the handle structure 104 connected to the jackhammer body 100, whereas FIG. 1B illustrates the handle structure 104 separate from the jackhammer body 100. In various embodiments, the handle structure 104 is connected to the jackhammer body 100 via a mounting structure. The mounting structure is not shown in FIG. 1B, but will be described below. The jackhammer body 100 houses the pneumatic, mechanical, and/or electro-mechanical components, as is known in the art, for driving the hammer 102 of the jackhammer body 100.

The handle structure 104 includes a housing 106A that houses a first vibration suppression system and a housing 106B that houses a second vibration suppression system. The following description of the housing 106A and of the vibration suppression system within the housing 106A applies equally to the housing 106B and to the vibration suppression system within the housing 106B, which are not described separately in detail in the remaining disclosure. For example, the housing 106A includes an outer cover 108 and the housing 106B similarly includes an outer cover that is hidden from view and not indicated with a reference numeral in FIG. 1A.

Figure 11:
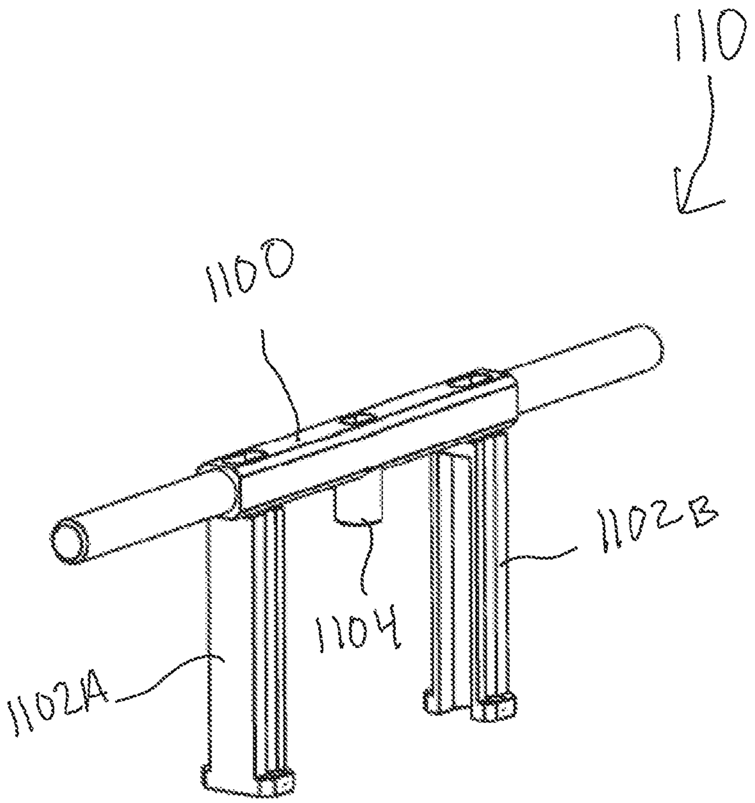
FIG. 11 illustrates a perspective view of a handle, according to an aspect of the present disclosure.

The handle structure 104 further includes a handle 110 that can be translated, or depressed, towards the jackhammer body 100 along the axis 114 or translated, or released, away from the jackhammer body 100 along the axis. In various embodiments, such as the illustrated embodiment, the handle 110 includes multiple discrete components that are connected to one another to form the handle 110. Specifically, with reference to FIG. 11, the handle 110 includes a handle member 1100, a handle guide 1102A, and a handle guide 1102B that are connected to one another. The discrete components of the handle 110 may be connected via a suitable connection mechanism (e.g., screws, rivets, bolts, adhesives, etc., collectively referred to herein as fasteners). In other embodiments, the handle 110 may be single, integral component. In at least some embodiments, the handle 110 may further include a stop member 1104 that is connected to, or integral with, the handle member 1100. The stop member 1104 is a component of a stiffness adjustment system that will be described below.

Figure 2:
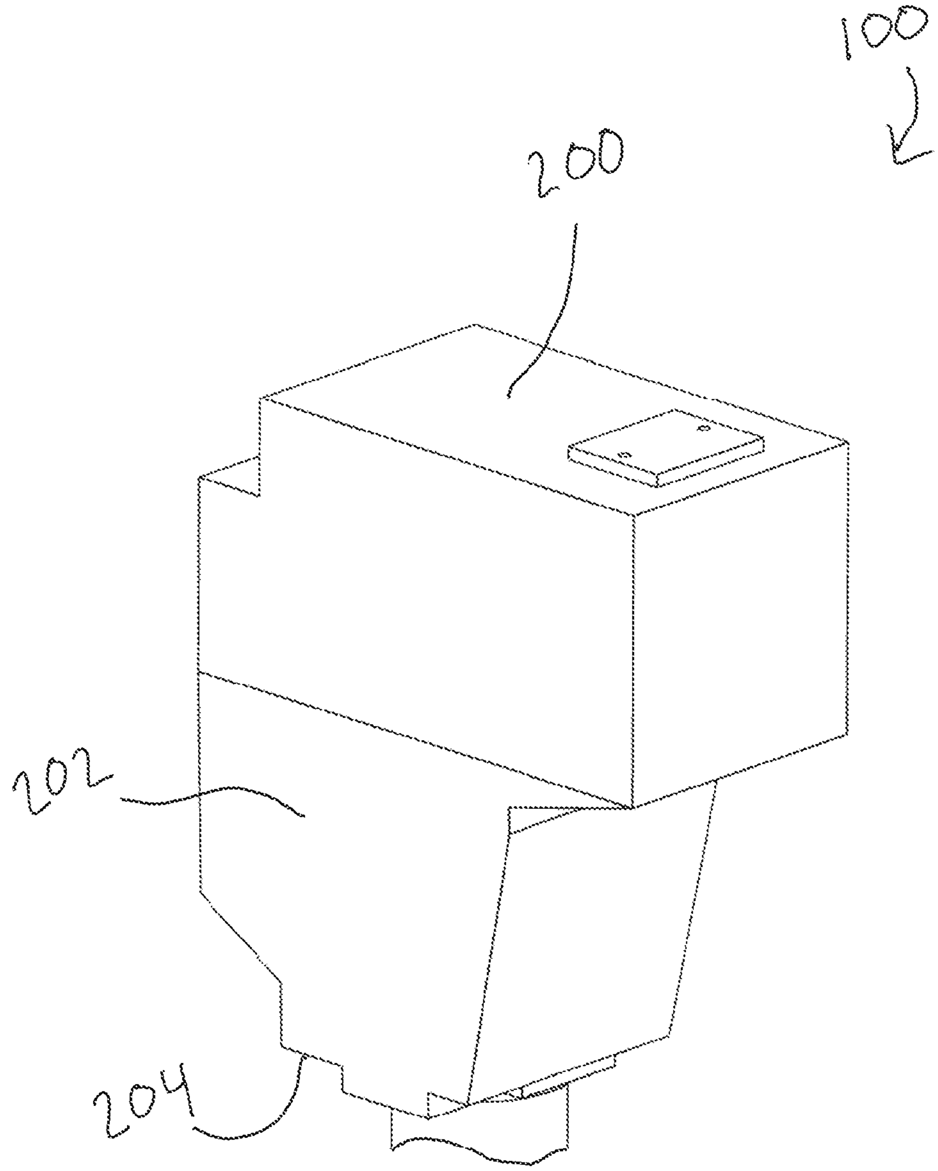
FIG. 2 illustrates a jackhammer body, according to an aspect of the present disclosure.

FIG. 2 illustrates an upper portion of the jackhammer body 100. The jackhammer body 100 includes an upper surface 200, a side surface 202, and a lower surface 204. The housing 106A is disposed on the side surface 202. An additional side surface on which the housing 106B is disposed is directly opposite the side surface 202 on the jackhammer body 100.

Figure 3:
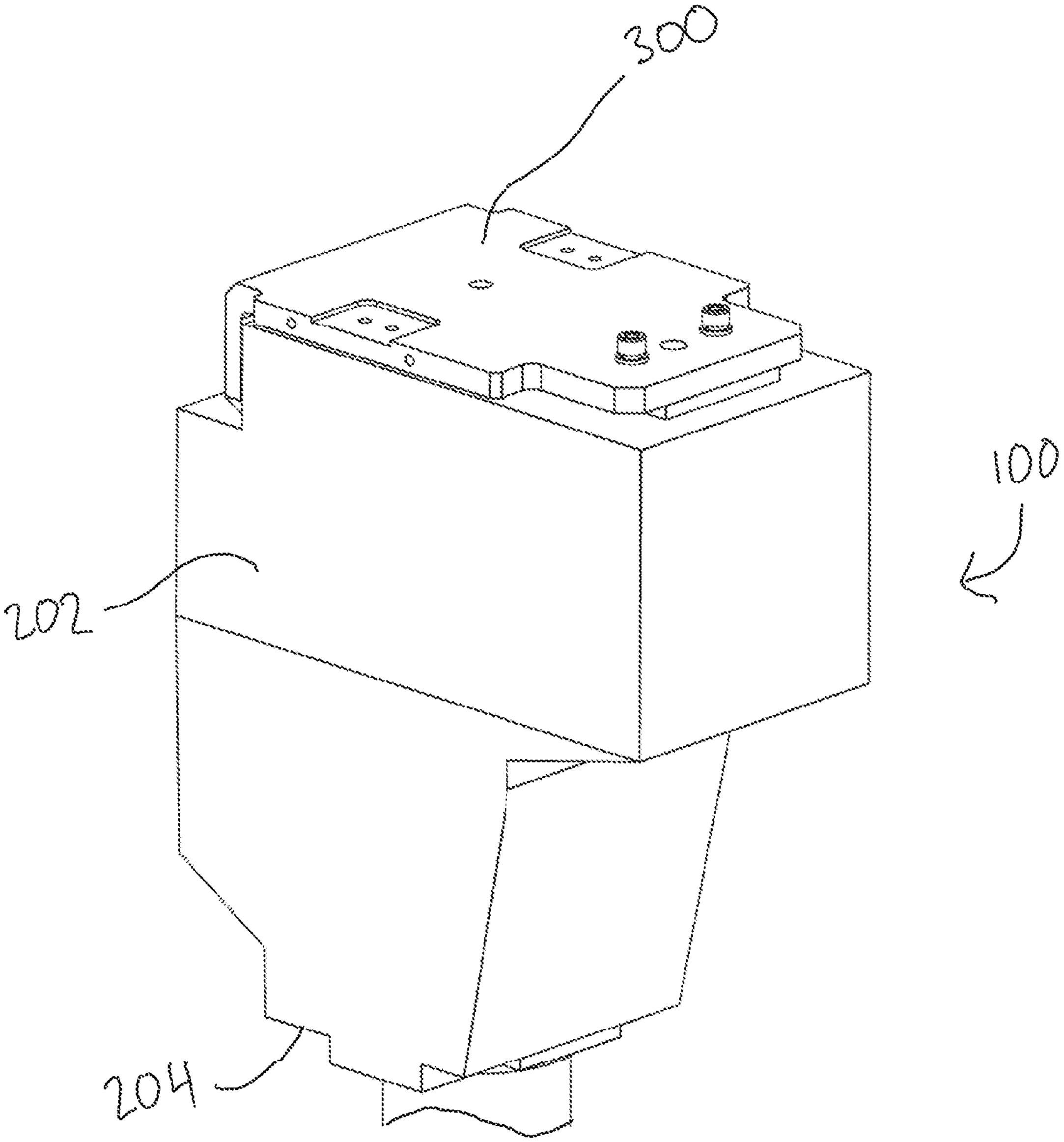
FIG. 3 illustrates an upper mount of a handle structure installed on the jackhammer body of FIG. 2, according to an aspect of the present disclosure.

As stated above, in various embodiments, the jackhammer 10 includes a mounting structure that connects the handle structure 104 to the jackhammer body 100. The components of the mounting structure may be considered components of the handle structure 104 or may be considered distinct components from the handle structure 104. FIGS. 3, 4A, 4B, and 5 illustrate an example embodiment of the mounting structure, though the mounting structure may take other suitable forms for connecting the handle structure 104 to the jackhammer body 100 in other embodiments of the jackhammer 10. In the illustrated embodiment, the mounting structure includes a mount 300, as shown in FIG. 3, that is connected (e.g., via one or more fasteners) to the upper surface 200 of the jackhammer body 100. The illustrated mounting structure further includes a shaft mount 400 shown in FIG. 4A. The shaft mount 400, in an embodiment, includes a body 402 that has openings 404A and 404B for fasteners to attach the shaft mount 400 to the mount of 300. The illustrated embodiment of the shaft mount 400 further includes a surface 406 shaped to aid in maintaining a positioning of a shaft (e.g. the shaft 830 of FIG. 8), which will be described below. An opening 408 that extends through the surface 406 is able to accept a fastener that connects the shaft to the shaft mount 400.

Figure 4A:
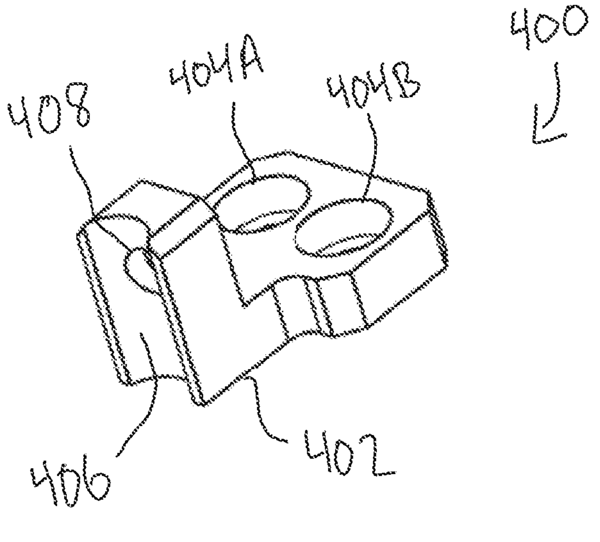
FIG. 4A illustrates a perspective view of a shaft mount, according to an aspect of the present disclosure.
Figure 4B:
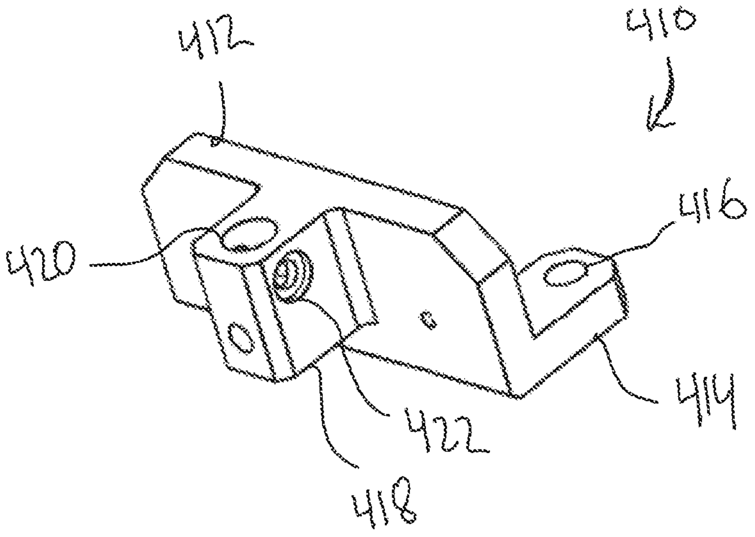
FIG. 4B illustrates a perspective view of a lower mount, according to an aspect of the present disclosure.
Figure 5:
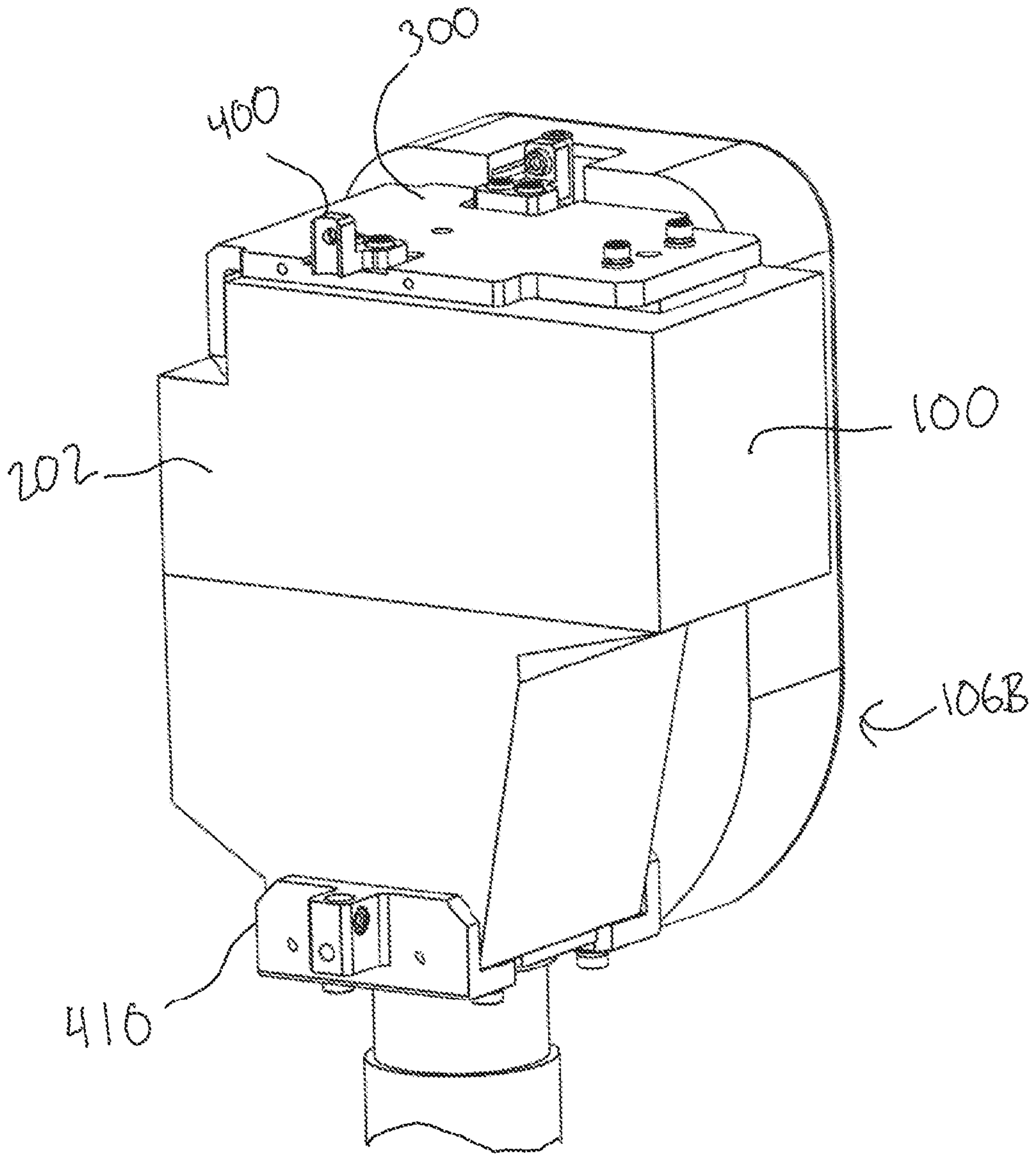
FIG. 5 illustrates the shaft mount of FIG. 4A installed on the upper mount of FIG. 3 and the lower mount of FIG. 4B installed on the jackhammer body of FIGS. 2 and 3, according to an aspect of the present disclosure.

FIG. 4B illustrates an embodiment of a mount 410 of the mounting structure. The mount 410 includes a body 412. An arm 414 extends from opposing sides of the body 412, though only a single arm 414 is visible in the figures. Each arm 414 includes an opening 416 through which a fastener can be inserted to connect the mount 410 to the lower surface 204 of the jackhammer body 100. The mount 410, in an embodiment, further includes a protrusion 418 extending from the body 414. The protrusion 418 includes an opening 420 sized to accept an end of the shaft connected to the shaft mount 400. The protrusion 418 may further include an opening 422 through which a fastener can be inserted to connect the shaft to the mount 410. FIG. 5 illustrates the mount 300, the shaft mount 400, and the mount 410 connected to the jackhammer body 100.

Figure 6:
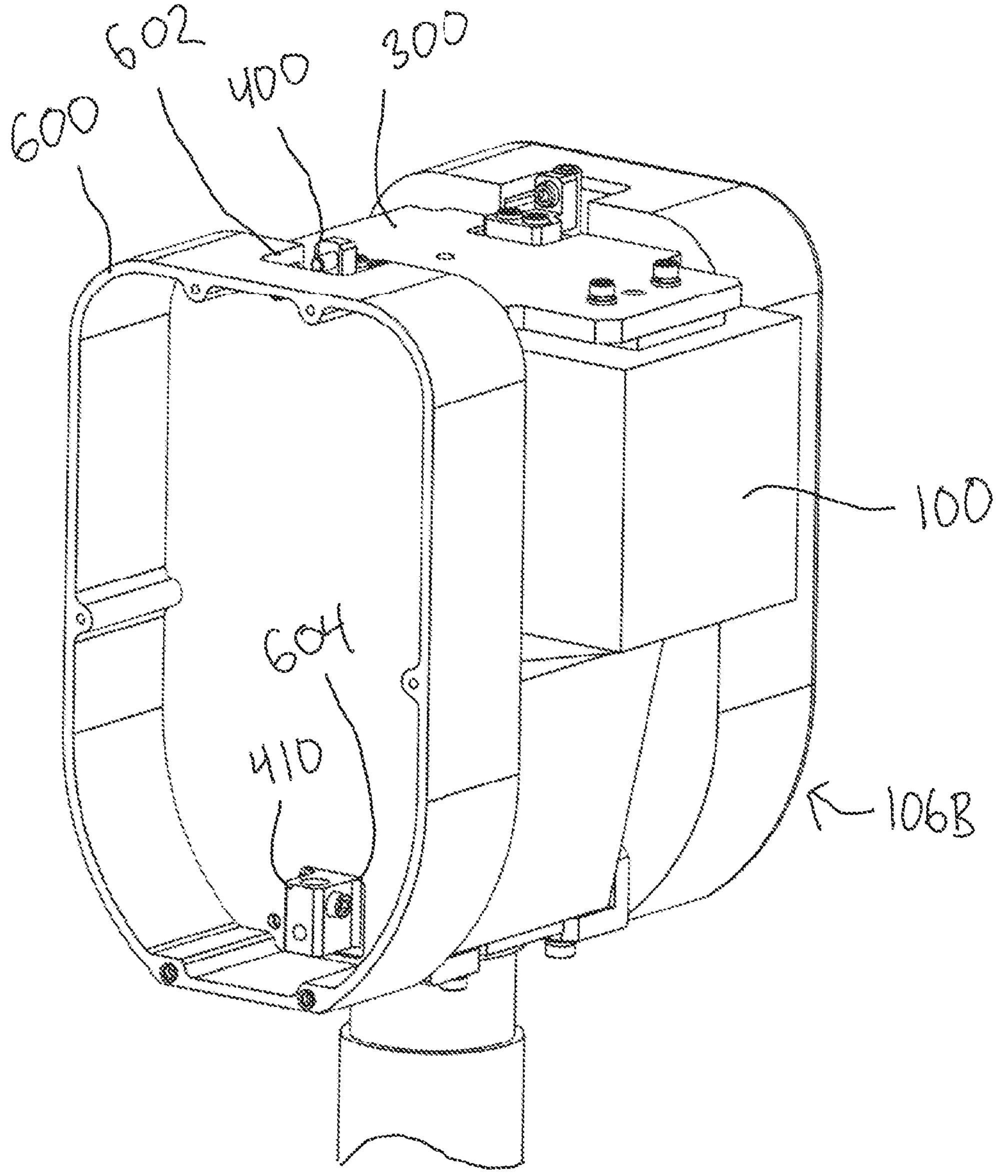
FIG. 6 illustrates an interior cover of the handle structure installed on the upper and lower mounts of the jackhammer body of FIG. 5, according to an aspect of the present disclosure.

As shown in FIG. 6, the illustrated embodiment of the jackhammer 10 includes a an inner cover 600 of the housing 106A connected (e.g., via one or more fasteners) to the mounts 300 and 410. The inner cover 600, in an embodiment, includes an opening 602 that enables the shaft mount 400 to extend into the interior of the inner cover 600. In the illustrated embodiment, the inner cover 600 further includes an opening 604 that enables the mount 410 to extend into the interior of the inner cover 600. FIG. 6 also shows the housing 106B, including a second inner cover, fully assembled and connected to mounts on the opposing side of the jackhammer body 100 as the first inner cover 600.

Figure 7:
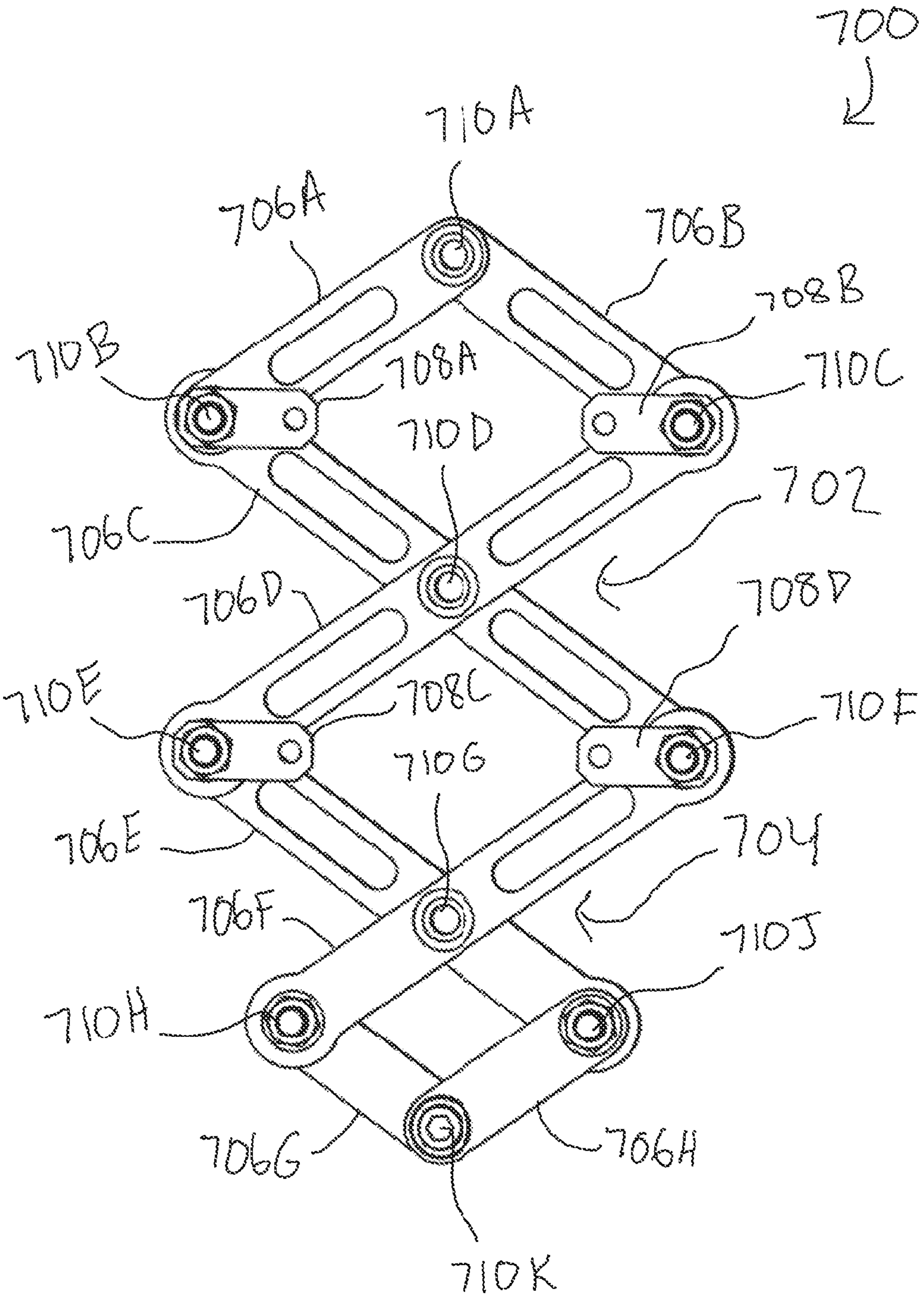
FIG. 7 illustrates a support structure of a vibration suppression system of the handle structure, according to an aspect of the present disclosure.

FIG. 7 illustrates a support structure 700 of the vibration suppression system according to some embodiments. The support structure 700 of the illustrated example includes an arrangement of support members in communication with the handle 110 configured to provide vibration suppression thereto in accordance with concepts herein. In the illustrated embodiment, a support member 706A is rotatably connected to a support member 706B at a joint 710A. A support member 706C is rotatably connected to the support member 706A at a joint 710B. A support member 706D is rotatably connected to the support member 706B at a joint 710C. The support member 706C and the support member 706D are also rotatably connected to one another at a joint 710D such that the support member 706C and the support member 706D cross over one another to thereby form an X-shaped support structure 702.

Continuing with the description of the support structure 700, a support member 706E is rotatably connected to the support member 706D at a joint 710E. A support member 706F is rotatably connected to the support member 706C at a joint 710F. The support member 706E and the support member 706F are also rotatably connected to one another as a joint 710G such that the support member 706E and the support member 706F cross over one another to thereby form an X-shaped support structure 704. A support member 706G is rotatably connected to the support member 706F at a joint 710H. A support member 706H is rotatably connected to the support member 706E at a joint 710J. The support member 706G is rotatably connected to the support member 706H at a joint 710K such that the support member 706G and the support member 706H form half of an X-shaped support structure.

In some embodiments, the support structure 700 may include one or more additional X-shaped structures for improved vibration suppression, though smaller loading capacity. For example, a third X-shaped support structure may be connected to the X-shaped support structure 704 and the support member 706G and support member 706H. Alternatively, the support structure 700 may include one less X-shaped structure for improved loading capacity, though decreased vibration suppression. For example, the X-shaped support structure 704 may be removed and the support member 706G and support member 706H are connected to the X-shaped support structure 702. As such, the number of X-shaped support structures can be adjusted based on the size and strength requirements of the jackhammer 10.

Figure 10:
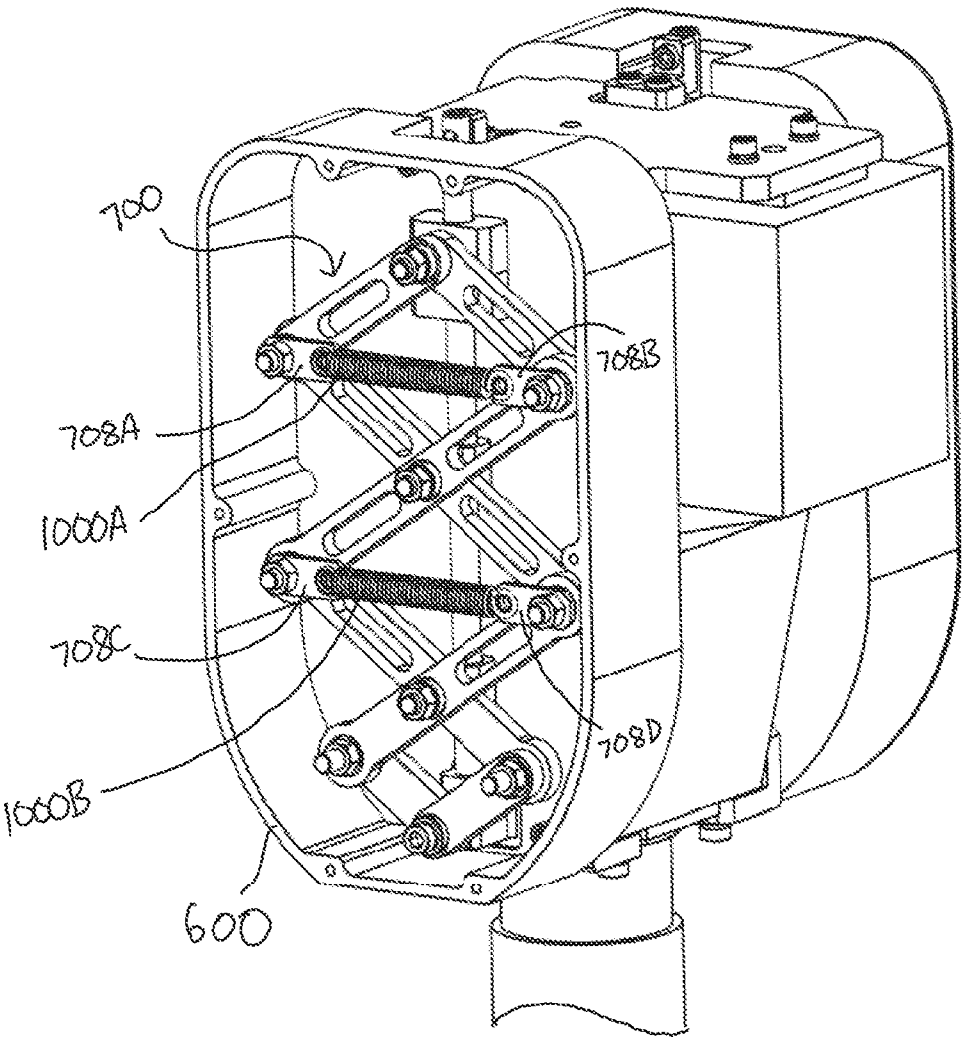
FIG. 10 illustrates resilient members installed with the support structure of the vibration suppression system of FIG. 9, according to an aspect of the present disclosure.

Some of the support members may have an equal length, whereas some of the support members may be longer or shorter than other support members. For example, the support members 706C and 706D may be longer than the support members 706E and 706F, which may be longer than support members 706A, 706B, 706G, and 706H. A length of each of the support members 706A-706H can be determined based on the nonlinear stiffness desired in the jackhammer 10 and considering the space available and desired performance of the jackhammer 10. In at least some embodiments, each of the support members 706A-706H has a suitable stiffness to withstand the forces exerted on the jackhammer 10 as well as by each of the resilient members 1000A and 1000B (FIG. 10). For example, each may be a rod having any suitable cross-section (e.g., circular, rectangular, etc.). Materials that provide the suitable stiffness for the support members 706A-706H include, for example, metal, plastic, carbon fiber, acrylic, etc.

In at least some embodiments, the support structure 700 includes one or more connect members that are constructed to connect to ends of a resilient member. For example, the illustrated embodiment of the support structure 700 includes a connect member 708A rotatably connected at the joint 710B, a connect member 708B rotatably connected at the joint 710C, a connect member 708C rotatably connected at the joint 710E, and a connect member 708D rotatably connected at the joint 710F. Each of the connect members 708A-708D, in the illustrated embodiment, includes an opening through which a portion of a resilient member may extend to connect to the resilient member to the connect member 708A, 708B, 708C, or 708D.

Figure 8:
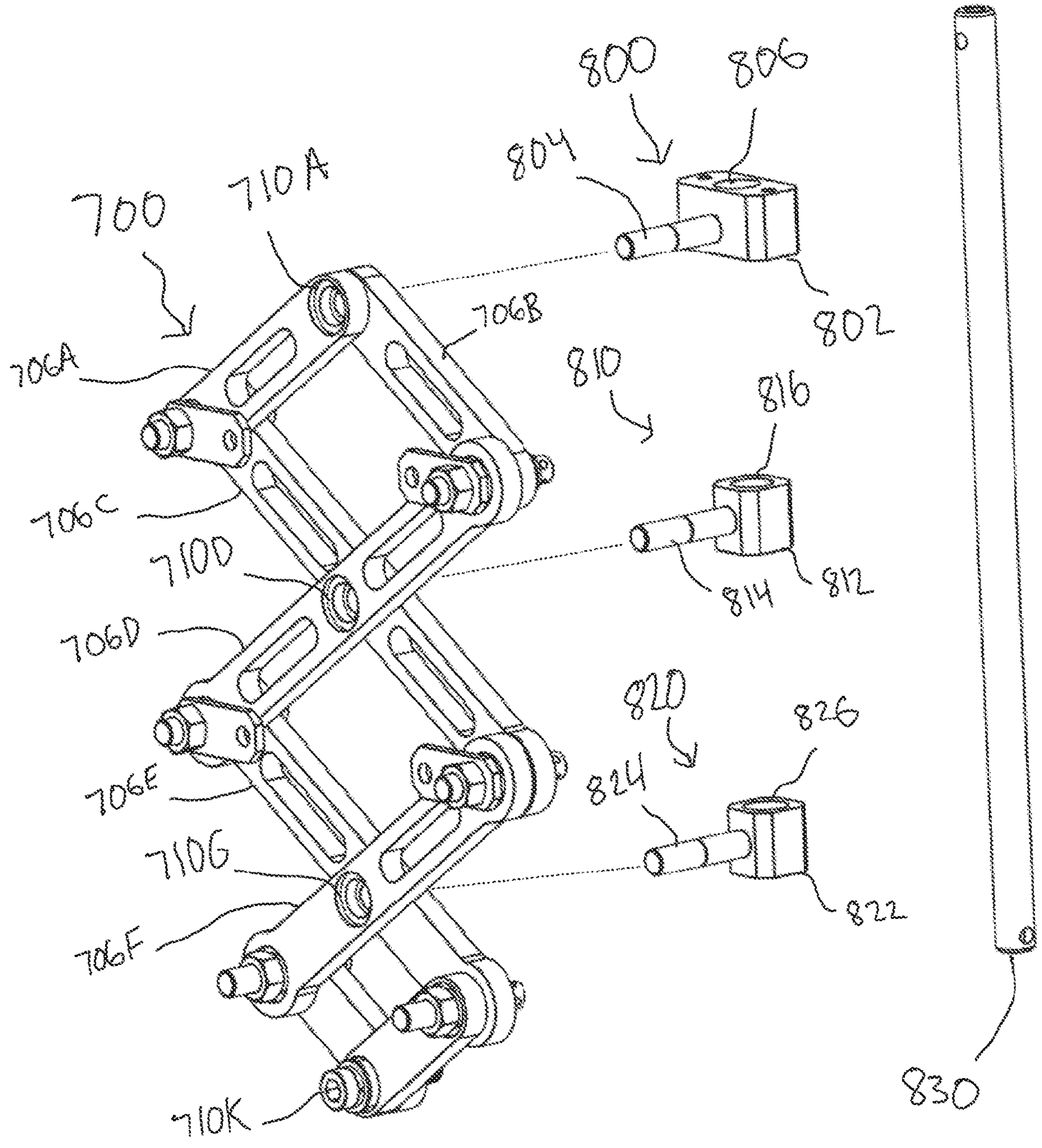
FIG. 8 illustrates components for mounting a shaft with respect to the support structure of FIG. 7, according to an aspect of the present disclosure

In at least some embodiments, the handle structure 104 includes components for maintaining centered movement of the support structure 700 along a line extending through the joints 710A, 710D, 710G, and 710K. For instance, as the support structure 700 is compressed, such as when the handle 110 is depressed towards the jackhammer body 100, the joint 710A moves closer to the joint 710K. FIG. 8 illustrates an embodiment of such components for maintaining centered movement of the support structure 700. In the example embodiment, the handle structure 104 includes pivot members 800, 810, and 820. The pivot member 800 includes a body 802, a rod 804 extending from the body, and an opening 806 extending through the body 802. A bearing may be positioned within the opening 806. The pivot member 800 is arranged such that the rod 804 extends through openings in the support members 706A and 706B at the joint 710A thereby forming a pivot axis of the joint 710A. The pivot member 810 includes a body 812, a rod 814 extending from the body, and an opening 816 extending through the body 812. A bearing may be positioned within the opening 816. The pivot member 810 is arranged such that the rod 814 extends through openings in the support members 706C and 706D at the joint 710D thereby forming a pivot axis of the joint 710D. The pivot member 820 includes a body 822, a rod 824 extending from the body, and an opening 826 extending through the body 822. A bearing may be positioned within the opening 826. The pivot member 820 is arranged such that the rod 824 extends through openings in the support members 706E and 706F at the joint 710G thereby forming a pivot axis of the joint 710G. A portion of each of the rods 804, 814, and 824 may be threaded.

Figure 9:
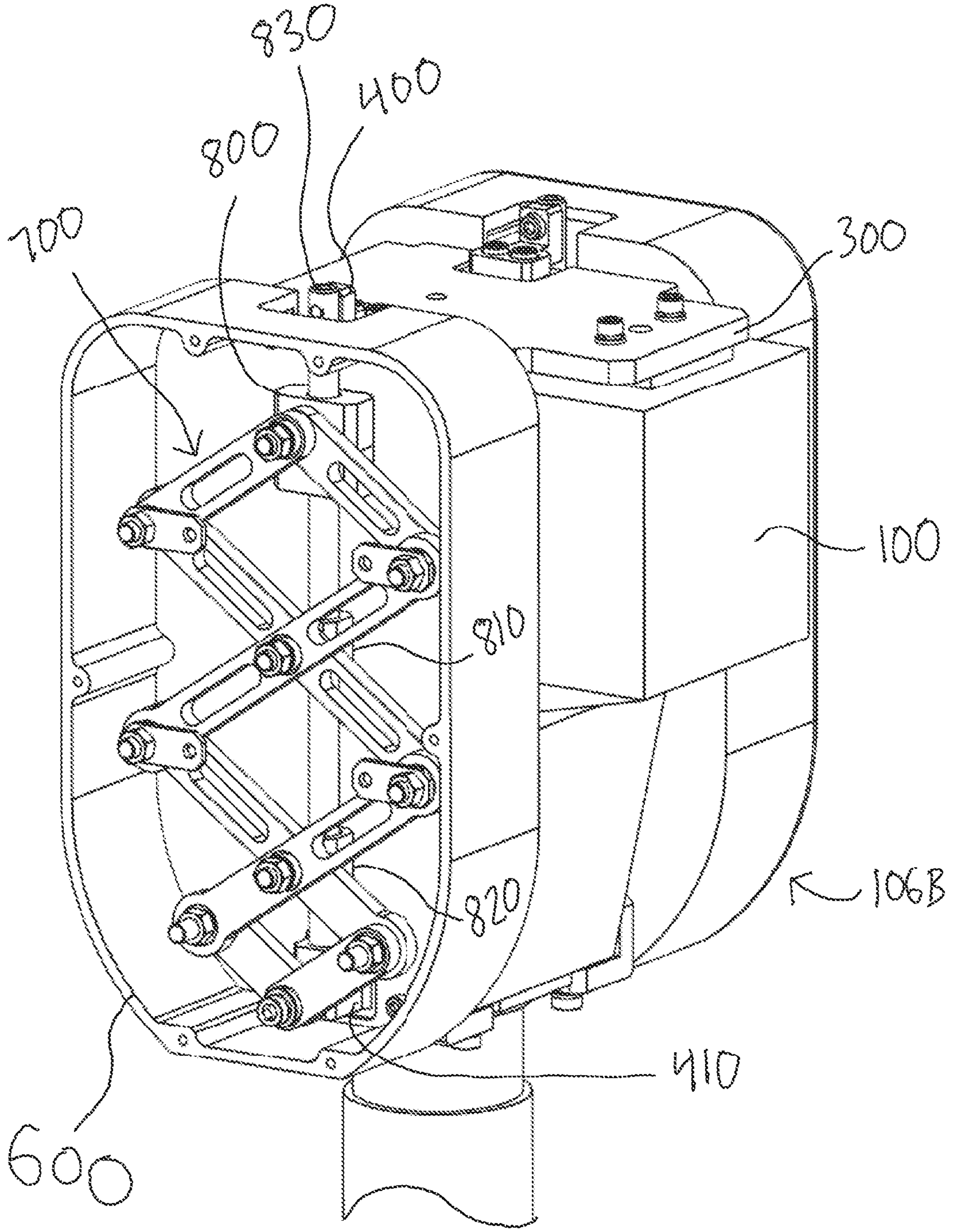
FIG. 9 illustrates the components of FIG. 8 disposed within the interior cover, according to an aspect of the present disclosure.

Also shown in FIG. 8 is a shaft 830. In the illustrated embodiment, as shown in FIG. 9, the shaft 830 is positioned through each of the respective openings 806, 816, and 826 of the pivot members 800, 810, and 820. In this way, the pivot members 800, 810, and 820 maintain centered movement of the support structure 700 along the shaft 830. In at least some aspects, the pivot members 800 and 820 set a maximum movement in either direction for the support structure 700. For instance, the pivot member 800 contacts the shaft mount 400 when the support structure 700 is fully expanded, and the pivot member 820 contacts the mount 410 when the support structure is fully compressed. The depicted embodiment shows the shaft 830 as a cylindrical rod. In other embodiments, the shaft 830 may have another suitable cross-section (e.g., square, hexagonal, pentagonal, etc.) and the openings 806, 816, and 826 may be shaped accordingly.

The vibration suppression system includes an arrangement of at least one resilient member in conjunction with the support structure 700. The stiffness and elastic nature of the at least one resilient member, in conjunction with the arrangement of the at least one resilient member with respect to the support structure 700, provides the vibration suppression effect of the vibration suppression system. As shown in FIG. 10, in at least some embodiments, the vibration suppression system includes at least one (e.g., 1, 2, or 3) resilient member 1000A connected to the connect member 708A and to the connect member 708B. In some aspects, connect members 708A and 708B may be omitted and the at least one resilient member 1000A is instead rotatably connected at the joint 710B and at the joint 710C. In various embodiments, the vibration suppression system includes at least one (e.g., 1, 2, or 3) resilient member 1000B connected to the connect member 708C and to the connect member 708D. In some aspects, connect members 708C and 708D may be omitted and the at least one resilient member 1000B is instead rotatably connected at the joint 710E and at the joint 710F.

Figure 12:
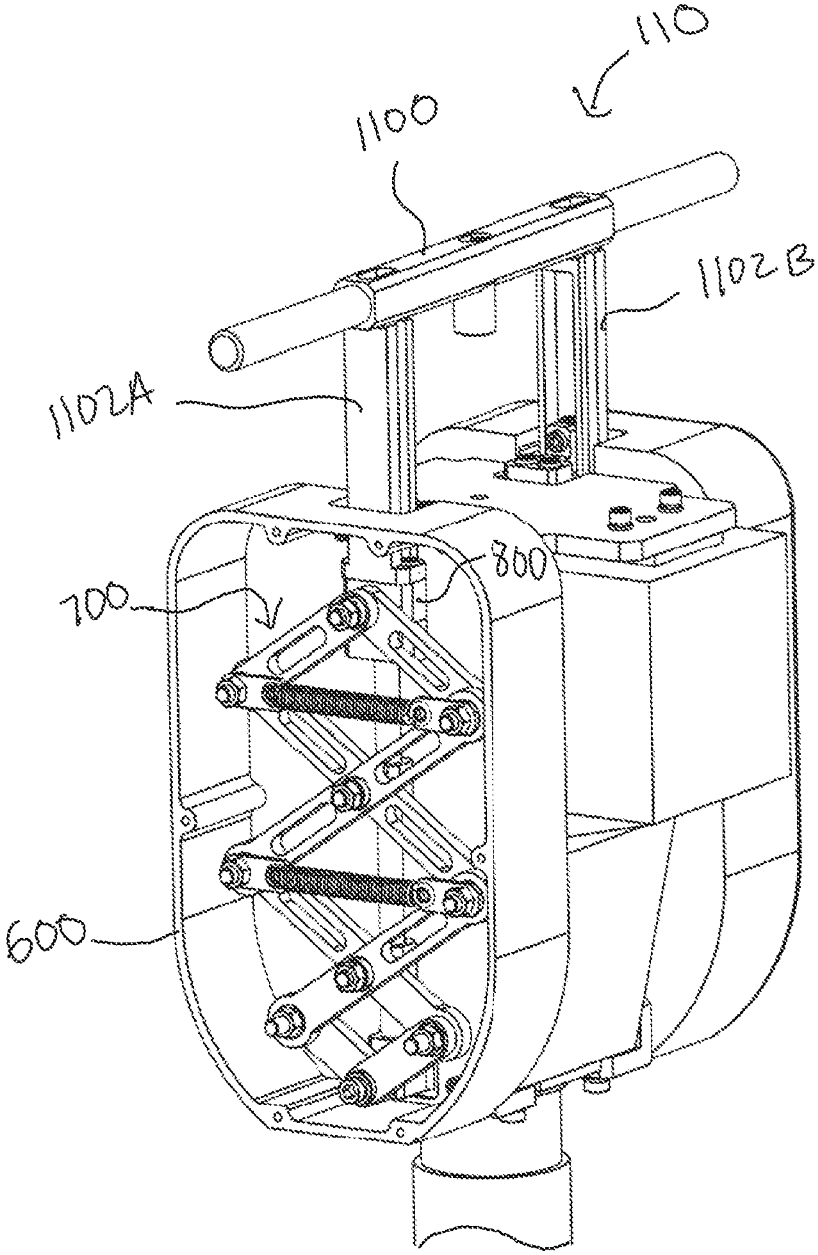
FIG. 12 illustrates the handle of FIG. 11 installed with the vibration suppression systems of the jackhammer, according to an aspect of the present disclosure.

FIG. 12 illustrates the handle 110 connected to the fully assembled vibration suppression system disposed within the interior cover 600. As shown, the handle guide 1102A of the handle 110 is connected to the mount 800 in the illustrated embodiment.

Figure 13B:
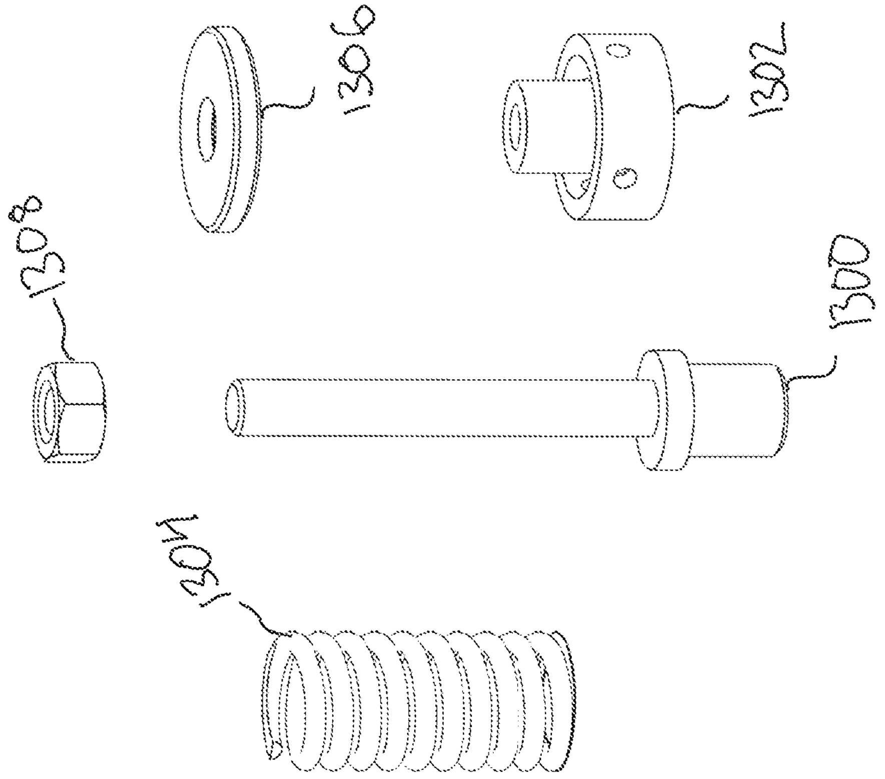
FIG. 13B illustrates an exploded view of the stiffness adjustment system of FIG. 13A, according to an aspect of the present disclosure.
Figure 13A:
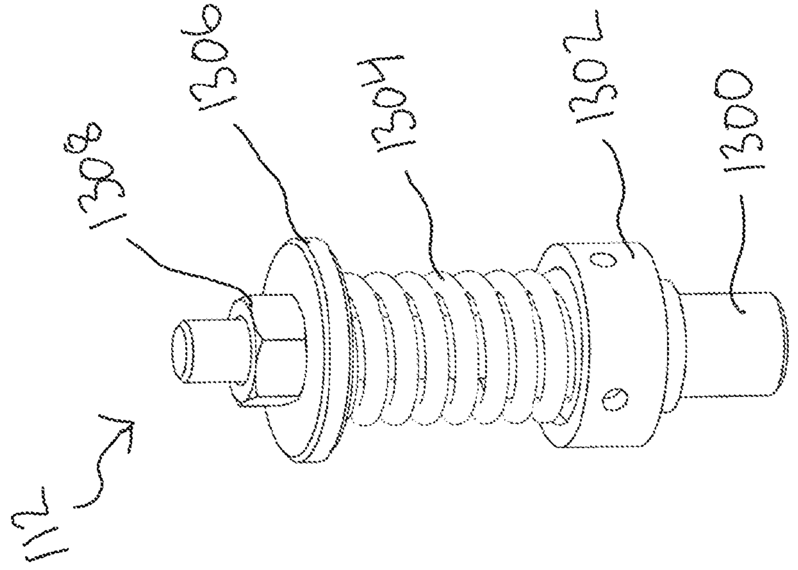
FIG. 13A illustrates a perspective view of a stiffness adjustment system, according to an aspect of the present disclosure.

As described above, in at least some embodiments, a stiffness of the vibration suppression systems may be adjusted via an adjustment system 112 of the handle structure 104. FIGS. 13A and 13B illustrate an example of a first portion of the adjustment system 112 that is included with (e.g., connected to) the mount 300 of the handle structure 104. The mount 300 can be considered a part of the adjustment system 112 of the handle structure 104 or a separate component to which the handle structure 104 is attached. The first portion of the adjustment system 112 includes, in an embodiment, a shaft 1300, an adjusting member 1302, a resilient member 1304, a first stop member 1306, and a nut 1308. The shaft 1300, adjusting member 1302, resilient member 1304, first stop member 1306, and nut 1308 are each disposed around the shaft 1300 as shown. Though not illustrated, the shaft 1300 may include at least one threaded portion to which the adjusting member 1302 and/or the nut 1308 connects. The resilient member 1304 is disposed between the adjusting member 1302 and the first stop member 1306. The nut 1308 maintains a distance between the adjusting member 1302 and the first stop member 1306 against the elastic force of the resilient member 1304. Moving the adjusting member 1302 along the shaft (e.g., rotating the adjusting member 1302) changes a distance between the adjusting member 1302 and the first stop member 1306 and thereby changes a stiffness of the resilient member 1304.

Figure 14:
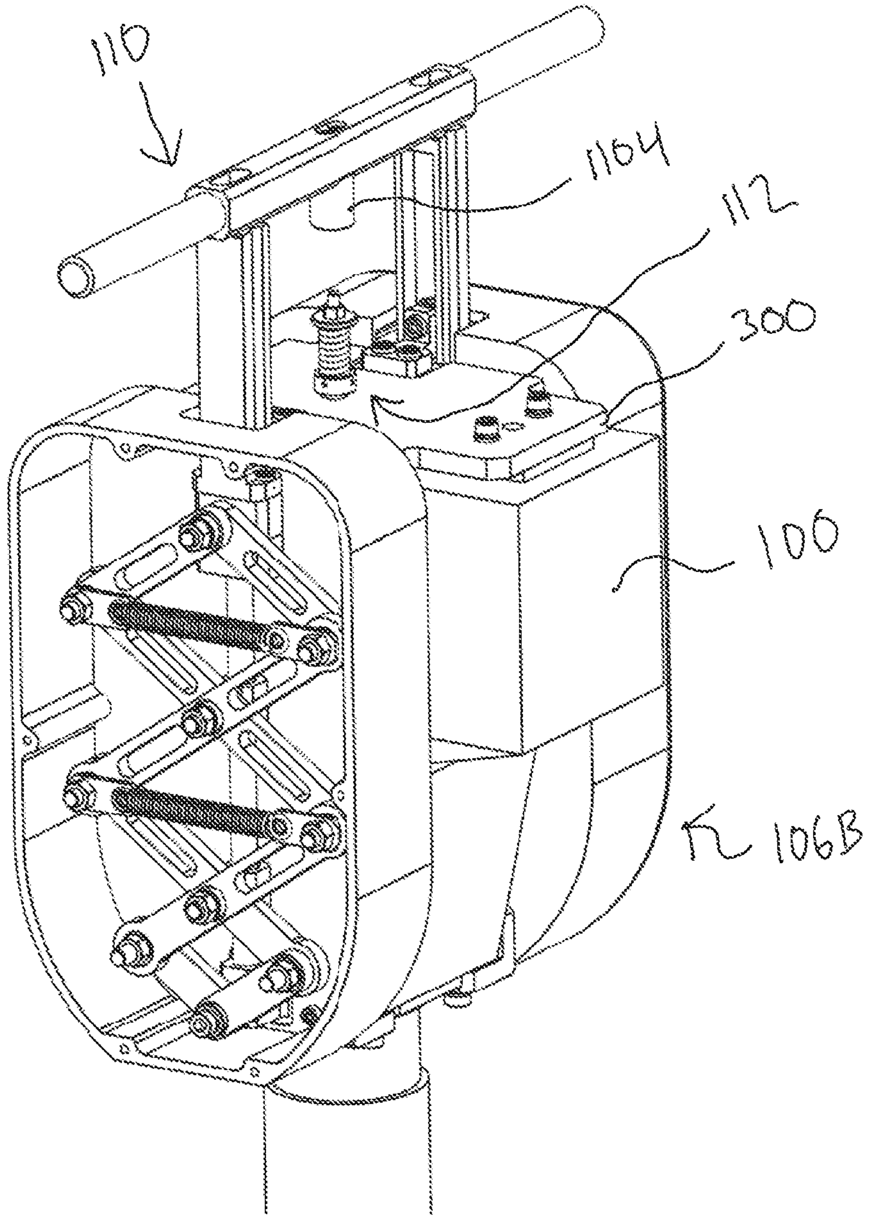
FIG. 14 illustrates the stiffness adjustment system of FIGS. 13A and 13B installed on the upper mount of the jackhammer, according to an aspect of the present disclosure.

FIG. 14 illustrates the first portion of the adjustment system 112 connected to the mount 300 and further illustrates a second stop member 1104 connected to the handle 110. The second stop member 1104 is a second portion of the adjustment system 112. When the handle 110 is pressed sufficiently towards the jackhammer body 100, the second stop member 1104 contacts the first stop member 1306. As such, the stiffness of the resilient member 1304 affects a stiffness of the vibration suppression systems since the handle 110 is connected to each of the vibration suppression systems. The stiffness of the vibration suppression systems can be adjusted as desired by an operator of the handheld machine by adjusting the adjusting member 1302. For example, an operator may adjust the stiffness of the vibration suppression systems to adjust the range of handle 110 depression (e.g., a distance the handle 110 is away from the jackhammer body 100) within which the vibration suppression systems exhibit quasi-zero stiffness.

As is evident from the preceding description, a vibration suppression system includes the support structure 700, the resilient members connected to the support structure 700 (e.g., at least one of the resilient members 1000A and 1100B), the pivot members 800, 810, and 820, the shaft 830, the stiffness adjustment system 112, and the various fixation components. At least one of the mount 300, the shaft mount 400, and the mount 410 can also be considered components of the vibration suppression system.

Figure 15:
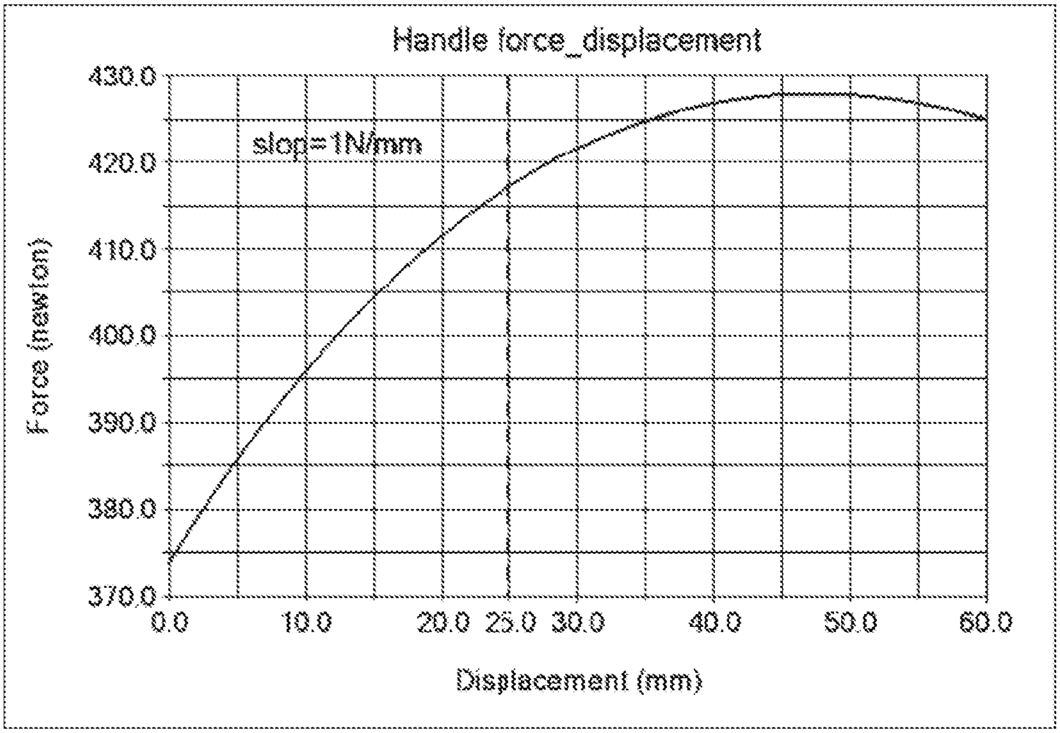
FIG. 15 is a graph showing a measured vertical static force of the handle of the handle structure in relation to displacement of the handle.

FIG. 15 is a graph showing a relationship of static force F and vertical displacement (e.g., along an axis extending through the shaft 830) of the handle 110 for an example embodiment of the jackhammer 10. In the example embodiment, four horizontal resilient members (e.g., resilient members 1000A and 1000B) are included with each of the support structures 700 of the vibration suppression systems. The stiffness of the vertical resilient member (e.g., resilient member 1304) in this example is 13.7 N/mm and the initial tension is 317 N. Therefore, the resilient member 1304 needs about 375 N of force to push the handle towards the jackhammer body 100 in the initial position, which is shown in FIG. 15. When the handle is pushed 25 mm towards the jackhammer body 100, the pushing force from a human operator is about 416 N. The vertical stiffness of the vibration suppression system reaches 1 N/mm. The resonant frequency f of the X-shaped structures 702 and 704 are mainly affected by the linear factor $\sqrt{K/M}$. The resonant frequency is given by Equation (1) below. According to Equation (1), the resonant frequency of the handle 110 is about 0.8 Hz when it is pushed down 25 mm.

$$f = \frac{1}{2\pi}\sqrt{\frac{K}{M}} \quad (1)$$

Figure 16:
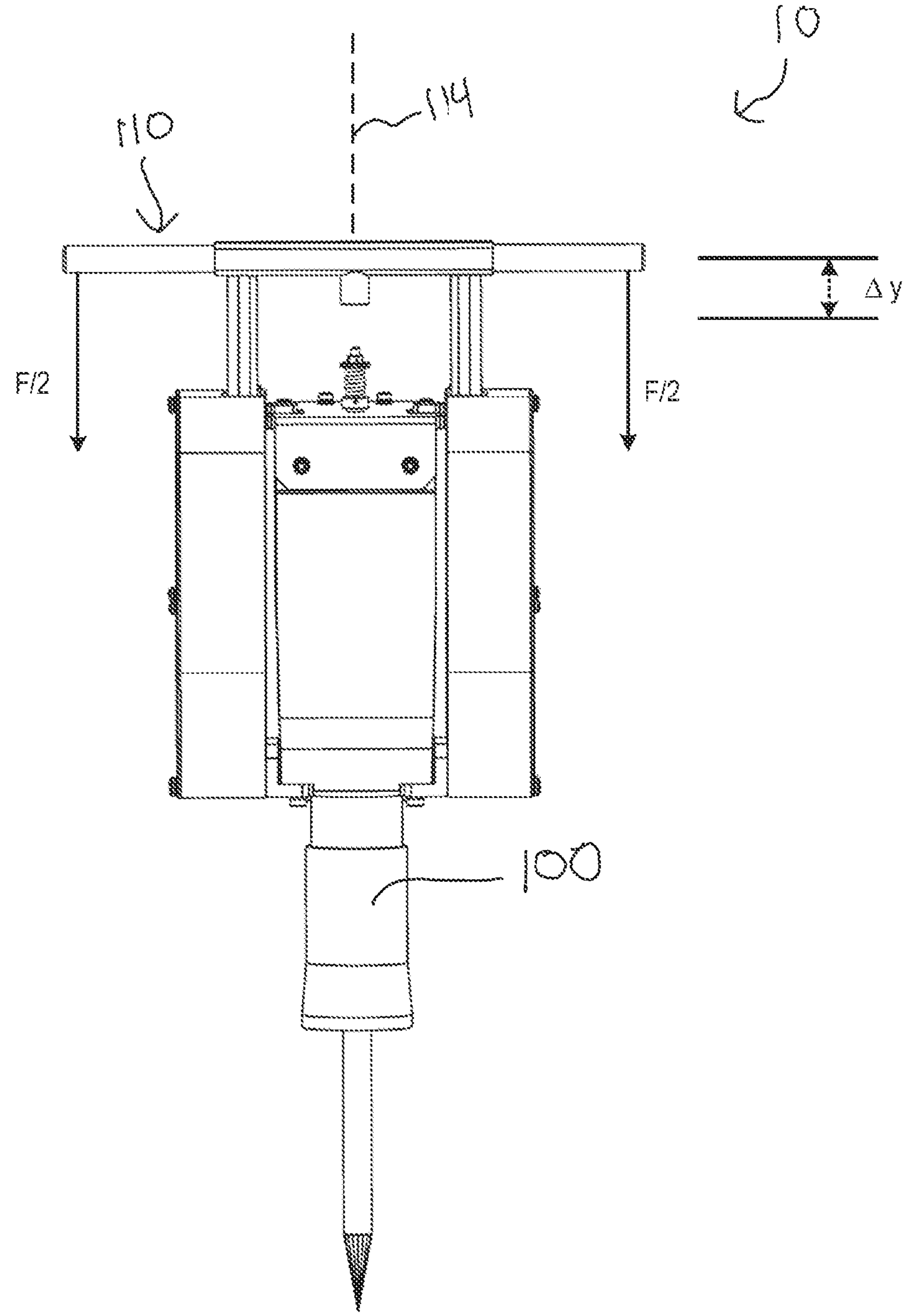
FIG. 16 is a schematic of the jackhammer of FIG. 1 depicting measurement parameters.

FIG. 16 illustrates a side view of the jackhammer 10 showing vectors indicating a force F applied to the handle 110 and a displacement Δy of the handle 110 in a direction along the axis 114 and towards the jackhammer body 100. FIG. 17 shows a table of displacement Δy values and corresponding force F values measured for an example embodiment of a jackhammer 10 that includes two horizontal resilient members (e.g., resilient members 1000A and 1000B) with each of the support structures 700 of the vibration suppression systems. As shown in the example, the initial force on the handle 110 towards the jackhammer body 100 was about 20 N because the initial force and pretension force of the resilient members (e.g., resilient members 1000A and 1000B) connected to the X-shaped support structures (e.g., X-shaped support structures 702 and 704). When the handle 110 was displaced 66 mm, the force was 245 N.

Figure 19A:
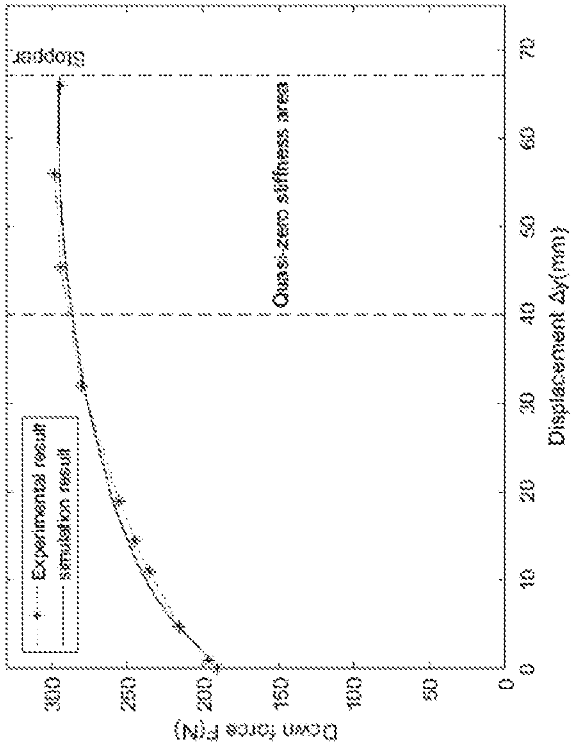
FIGS. 19A and 19B are graphs of the first and second measurements shown in the table of FIG. 18, respectively.
Figure 19B:
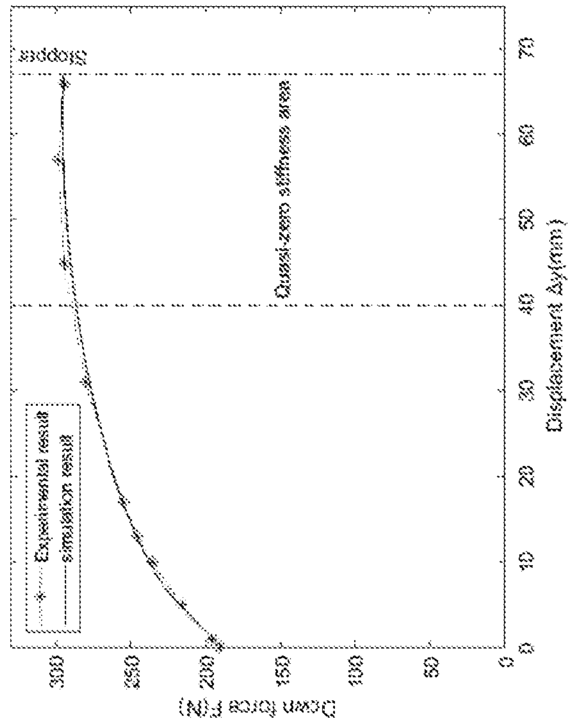

FIG. 18 is a table showing first and second measured displacement Δy values and corresponding force F values measured for an example embodiment of a jackhammer 10 that includes four horizontal resilient members (e.g., resilient members 1000A and 1000B) with the support structures 700 of the vibration suppression systems. In this example embodiment, each of the resilient members has a stiffness of 13.7 N/mm. When handle 110 was pushed towards the jackhammer body 100 about 57 mm from an initial position, the jackhammer 10 reached a maximum force point. After this maximum force point, the pushing force began to decrease. The quasi-zero stiffness region, in this example, was from 40 mm to 67 mm displacement of the handle 110. The vibration suppression systems working in the quasi-zero stiffness region improve the vibration suppression of the jackhammer 10. When the handle was pushed about 57 mm toward the jackhammer body 100, the vibration suppression system entered into a negative stiffness region. The adjustment system 112 helps to balance the negative stiffness. In this example, the vertical spring (e.g., resilient member 1304) has a stiffness of 0.2 N/mm. FIGS. 19A and 19B are graphs depicting the data of the table in FIG. 18 along with simulation data.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of the present application is not intended to be limited to the particular embodiments of the process, machine, manufacture, composition of matter, means, methods and steps described in the specification. The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A handle structure for vibration suppression comprising:

a handle; and a vibration suppression system connected to the handle, wherein the vibration suppression system comprises:

a first X-shaped support structure comprising a first support member rotatably connected to a second support member at a first joint;

a second X-shaped support structure rotatably connected to the first X-shaped support structure at a second joint and a third joint, the second X-shaped support structure comprising a third support member rotatably connected to a fourth support member at a fourth joint;

a first resilient member rotatably connected to the first support member and to the second support member;

a second resilient member rotatably connected to the first, second, third, and fourth support members;

a first pivot member comprising a first body, a first opening extending through the first body, and a first rod extending from the first body; and a shaft disposed through the first opening of the first pivot member, wherein the first support member and the second support member are configured to rotate about the first rod at the first joint.

2. The handle structure of claim 1, wherein the first resilient member is connected to a first connect member that is rotatably connected to the first support member at a fifth joint, and wherein the second resilient member is connected to a second connect member that is rotatably connected to the second support member at a sixth joint.

3. The handle structure of claim 1, further comprising a fifth support member and a sixth support member, wherein the first X-shaped support structure is rotatably connected to the fifth and sixth support members, and wherein the fifth support member is rotatably connected to the sixth support member.

4. The handle structure of claim 1, further comprising a seventh support member and an eighth support member, wherein the second X-shaped support structure is rotatably connected to the seventh and eighth support members, and wherein the seventh support member is rotatably connected to the eighth support member.

5. The handle structure of claim 1, further comprising:

a second pivot member comprising a second body, a second opening extending through the second body, and a second rod extending from the second body, wherein the third support member and the fourth support member are configured to rotate about the second rod at the fourth joint, and wherein the shaft is disposed through the second opening of the second pivot member.

6. The handle structure of claim 5, further comprising a mount, wherein an end of the shaft is connected to the mount.

7. The handle structure of claim 1, wherein each of the first and second resilient members is a spring.

8. A handle structure for vibration suppression comprising:

a handle comprising a first leg and a second leg;

a first vibration suppression system connected to the first leg, wherein the first vibration suppression system comprises:

a first support member, a second support member rotatably connected to the first support member at a first joint, and a first resilient member rotatably connected to the first support member at a second joint and to the second support member at a third joint; and a second vibration suppression system connected to the second leg, wherein the second vibration suppression system comprises:

a third support member, a fourth support member rotatably connected to the third support member at a fourth joint, and a second resilient member rotatably connected to the third support member at a fifth joint and to the fourth support member at a sixth joint.

9. The handle structure of claim 8, further comprising an adjustment system configured to set a stiffness of the first and second vibration suppression systems.

10. The handle structure of claim 9, wherein the adjustment system comprises:

a shaft including a threaded portion;

an adjusting member disposed around the shaft;

a first stop member disposed around the shaft;

a resilient member disposed around the shaft and between the adjusting member and the first stop member, wherein movement of the adjusting member along the shaft alters a stiffness of the resilient member; and a second stop member.

11. The handle structure of claim 10, further comprising a first mount, wherein the shaft is connected to the first mount, and wherein the handle includes the second stop member.

12. The handle structure of claim 8, wherein the first vibration suppression system further comprises:

a fifth support member rotatably connected to the first support member at a seventh joint, a sixth support member rotatably connected to the fifth support member at an eight joint and to the second support member at a ninth joint, and a third resilient member rotatably connected to the first support member and the fifth support member at the seventh joint and to the second support member and the sixth support member at the ninth joint; and the second vibration suppression system further comprises:

a seventh support member rotatably connected to the third support member at a tenth joint, an eighth support member rotatably connected to the seventh support member at an eleventh joint and to the fourth support member at a twelfth joint, and a fourth resilient member rotatably connected to the third support member and the seventh support member at the tenth joint and to the fourth support member and the eighth support member at the twelfth joint.

13. The handle structure of claim 8, wherein each of the first and second resilient members is a spring.

14. A jackhammer comprising:

a body; and a handle structure connected to the body, wherein the handle structure includes:

a handle comprising a first leg and a second leg, wherein the handle is configured to translate relative to the body along a first axis, a first vibration suppression system connected to the first leg, wherein the first vibration suppression system comprises a first plurality of support members and a first plurality of resilient members, and wherein the first plurality of support members and the first plurality of resilient members are arranged such that the first vibration suppression system is configured to exhibit quasi-zero stiffness during operation of the jackhammer, and a second vibration suppression system connected to the second leg, wherein the second vibration suppression system comprises a second plurality of support members and a second plurality of resilient members, and wherein the second plurality of support members and the second plurality of resilient members are arranged such that the second vibration suppression system is configured to exhibit quasi-zero stiffness during operation of the jackhammer.

15. The jackhammer of claim 14, wherein the first and second vibration suppression systems are each configured to exhibit quasi-zero stiffness based on a force applied to the handle and a location of the handle relative to the body along the first axis.

16. The jackhammer of claim 14, wherein the handle structure further comprises an adjustment system configured to adjust a stiffness of the handle structure with respect to a direction along the first axis.

17. The jackhammer of claim 16, wherein the adjustment system comprises a first stop member and a second stop member, wherein the handle includes the second stop member, and wherein the second stop member contacts the first stop member when the handle is translated towards the body along the first axis.

18. The jackhammer of claim 14, wherein the body comprises a first side opposite a second side, wherein the first vibration suppression system is disposed on the first side of the body, and wherein the second vibration suppression system is disposed on the second side of the body.

19. The jackhammer of claim 14, wherein each of the first and second plurality of resilient members is a spring.

* * * * *